United States Patent
MacInnis et al.

(10) Patent No.: US 7,916,784 B2
(45) Date of Patent: *Mar. 29, 2011

(54) METHOD AND SYSTEM FOR INVERSE TELECINE AND FIELD PAIRING

(75) Inventors: Alexander MacInnis, Lake Oswego, OR (US); Chenhui Feng, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1560 days.

This patent is subject to a terminal disclaimer.

(21) Appl. No.: 11/254,455

(22) Filed: Oct. 20, 2005

(65) Prior Publication Data

US 2007/0097259 A1    May 3, 2007

(51) Int. Cl.
- *H04N 7/12* (2006.01)
- *H04N 11/02* (2006.01)
- *H04N 11/04* (2006.01)

(52) U.S. Cl. ............ 375/240.1; 348/448; 348/452; 348/628; 348/701; 375/240.12

(58) Field of Classification Search .......... 348/448, 348/701, 449, 451, 452, 607; 375/240.1
See application file for complete search history.

(56) References Cited

U.S. PATENT DOCUMENTS

| | | | | |
|---|---|---|---|---|
| 6,633,612 B2* | 10/2003 | Selby | ...... | 375/240.16 |
| 7,567,617 B2* | 7/2009 | Holcomb | ...... | 375/240.13 |
| 2004/0225997 A1* | 11/2004 | Van De Vanter et al. | ...... | 717/109 |
| 2007/0091214 A1* | 4/2007 | MacInnis et al. | ...... | 348/701 |
| 2008/0088746 A1* | 4/2008 | Walls | ...... | 348/701 |

\* cited by examiner

*Primary Examiner* — Gregory M Desire
(74) *Attorney, Agent, or Firm* — McAndrews, Held & Malloy, Ltd.

(57) ABSTRACT

Certain aspects of a method and system for inverse telecine and field pairing may comprise receiving a plurality of fields of alternating polarity. A current field may be weaved with its corresponding adjacent field of opposite polarity. A polarity change count value may be calculated based on the weaving of the current field with its corresponding adjacent field of opposite polarity. The method may determine whether to utilize a progressive scheme or an interlaced scheme to encode the received plurality of fields of alternating polarity based at least in part on the calculated polarity change count value. At least one of a top field first (TFF) scheme, a bottom field first (BFF) scheme, a top field first-repeat first field (TFF-RFF) scheme and a bottom field first-repeat first field (BFF-RFF) scheme may be chosen to pair the plurality of fields of alternating polarity.

26 Claims, 14 Drawing Sheets

METHOD AND SYSTEM FOR INVERSE TELECINE AND FIELD PAIRING

CROSS-REFERENCE TO RELATED APPLICATIONS/INCORPORATION BY REFERENCE

This application makes reference to:
U.S. patent application Ser. No. 11/254,450 filed Oct. 20, 2005, issued as U.S. Pat. No. 7,791,673 on Sep. 7, 2010; and
U.S. patent application Ser. No. 11/254,262 filed Oct. 20, 2005.

Each of the above stated applications is hereby incorporated herein by reference in its entirety.

FIELD OF THE INVENTION

Certain embodiments of the invention relate to the use of adaptive coding of fields and frames in video encoding. More specifically, certain embodiments of the invention relate to a method and system for inverse telecine and field pairing.

BACKGROUND OF THE INVENTION

Interlaced video comprises of fields, each of which may be captured at a distinct time interval. A pair of fields, for example, a top field and a bottom field may be considered to comprise a frame. The pictures forming the video comprise a plurality of ordered lines. During one of the time intervals, video content for the even-numbered lines may be captured. During the other time interval, video content for the odd-numbered lines may be captured. The even-numbered lines may be collectively known as the top field, while the odd-numbered lines may be collectively known as the bottom field. Alternately, the odd-numbered lines may be collectively known as the top field, while the even-numbered lines may be collectively known as the bottom field.

In the case of progressive video frames, all the lines of the frame may be captured during one time interval. Interlaced video may comprise fields that were converted from progressive frames. For example, a progressive frame may be converted into two interlaced fields by organizing the even numbered lines into one field and the odd numbered lines into another field.

When encoding interlaced video, i.e. video that consists of a sequence of fields; an encoder may have the ability to choose between coding individual fields as field pictures and coding pairs of adjacent fields as frame pictures. One method may be more efficient than another for any given frame or field to be encoded. When encoding frame pictures, an encoder may utilize coding methods that treat frames as progressive video. These are generally referred to as progressive coding tools. It is desirable to make the optimum choice between field and frame coding for every field or every pair of fields. In cases where there is little or no motion between adjacent fields, weaving two fields together to form a frame and encoding the resulting frame using progressive coding tools may be the preferred choice. Additionally, some interlaced video content may comprise 3:2 pulldown patterns, wherein for example 24 frames per second progressive video has been converted to 60 fields per second interlaced video. Typically the 3:2 pulldown video comprises a pattern wherein some fields from the original content are repeated two fields after their first occurrence, forming TBT (top bottom top) or BTB (bottom top bottom) patterns. When encoding video comprising a 3:2 pulldown pattern, it is desirable to detect and reverse the 3:2 pulldown pattern to reconstruct the video, for example, 24 frames per second progressive video before encoding, and to encode the resulting frames of video using progressive coding tools. It is desirable to detect transitions between normal interlaced video and 3:2 pulldown video, and vice versa, as quickly as possible. Additionally, some interlaced video content may comprise other patterns, such as 2:2 pulldown patterns, wherein progressive frames of content have been converted to interlace. In such cases it is desirable for an encoder to detect and reverse the pattern and reconstruct the original progressive frames of video, and to encode the resulting frames using progressive coding tools.

Traditional 3:2 pulldown detectors measure the similarity of fields of the same polarity, for example, top (T) and T or bottom (B) and B, two fields apart, and may utilize this similarity measure to decide whether the current video input follows a 3:2 pulldown pattern or not. In 3:2 pulldown, the first and third fields of the TBT and BTB frames are theoretically identical, although they are affected by noise. Other pairs of like-polarity fields normally have some inter-field differences, except where there is no motion, no lighting changes and no noise. This approach of testing like-polarity fields may not work for many cases of 3:2 pulldown. Even with only 3:2 pulldown and interlaced formats, comparison of only like-polarity fields with no other measurements may result in a significant delay in making reasonably accurate determination of transitions between 3:2 pulldown and interlace formats, with resulting artifacts.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for inverse telecine and field pairing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for inverse telecine and field pairing may comprise receiving a plurality of fields of alternating polarity. A current field may be weaved with its corresponding adjacent field of opposite polarity. A polarity change count (PCC) value may be calculated based on the weaving of the current field with its corresponding adjacent field of opposite polarity. The PCC value may be used to determine how well the current field and its corresponding adjacent field would fit together if they were combined into a progressive frame. The resulting fit determination may be used to decide whether to utilize a progressive scheme or an interlaced scheme to encode the current field and its corresponding adjacent field.

Figure 1A:
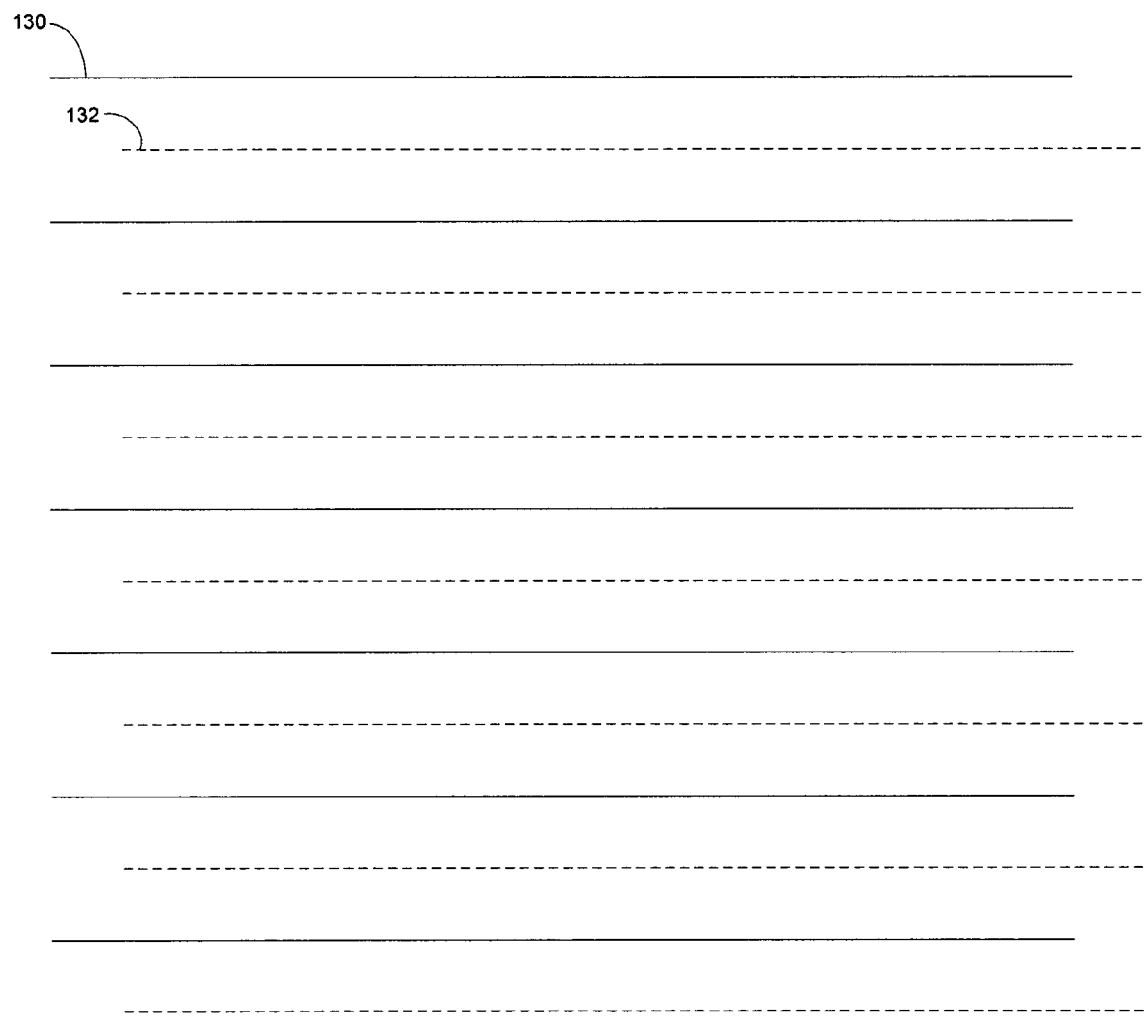
FIG. 1A is a diagram illustrating simplified bad weave artifacts that may be utilized in connection with an embodiment of the invention.

FIG. 1A is a diagram illustrating simplified bad weave artifacts that may be utilized in connection with an embodiment of the invention. Referring to FIG. 1A, there is shown a plurality of fields, for example, a current field 130 and a previous field 132. For example, a dark object that has moved to the left between the previous field 132 and the current field 130 may be illustrated as shown in FIG. 1A. Weaving the two fields together produces a comb effect on both the left and right edges of the object and may result in high vertical frequency spurious details in the portion of the image where this object appears. The presence of such weave artifacts may indicate the combination of inter-field content motion and content detail. The spurious details may alternate in value every line and have a vertical frequency of 1.0 pi, where pi is the Nyquist frequency of the frame. The highest vertical frequency on an interlaced display that may be perceived as detail, rather than blinking or flutter, may be determined by the Kell factor. For example, for 60 fields/second, the Kell factor is between 0.6 and 0.7. A Kell factor between 0.6 and 0.7 may indicate that the highest vertical frequency that looks like detail is not more than 0.7 pi.

The degree of bad weave artifacts that would be produced at each output sample if a given combination of fields were woven together may be estimated. The bad weave artifacts may be equivalent to the spurious details that may result when two adjacent fields are combined into one frame. The loss of efficiency due to progressive coding of a frame with weave artifacts may be compared to the loss of efficiency due to coding the two fields separately, for example, as an interlaced frame or as two separate fields to determine if the frames are coded as progressive or interlaced frames. The bad weave artifacts may indicate that the two fields under consideration are not from the same progressive frame. Alternatively, the bad weave artifacts may indicate that if the two fields were combined into a frame and the resulting frame is encoded using progressive techniques, the encoding efficiency may be impaired. If the content comprises progressive frames such as 3:2 pulldown or 2:2 pulldown, then there may not be any bad weave artifacts when fields from the same source frame are combined into a single frame.

Figure 1B:
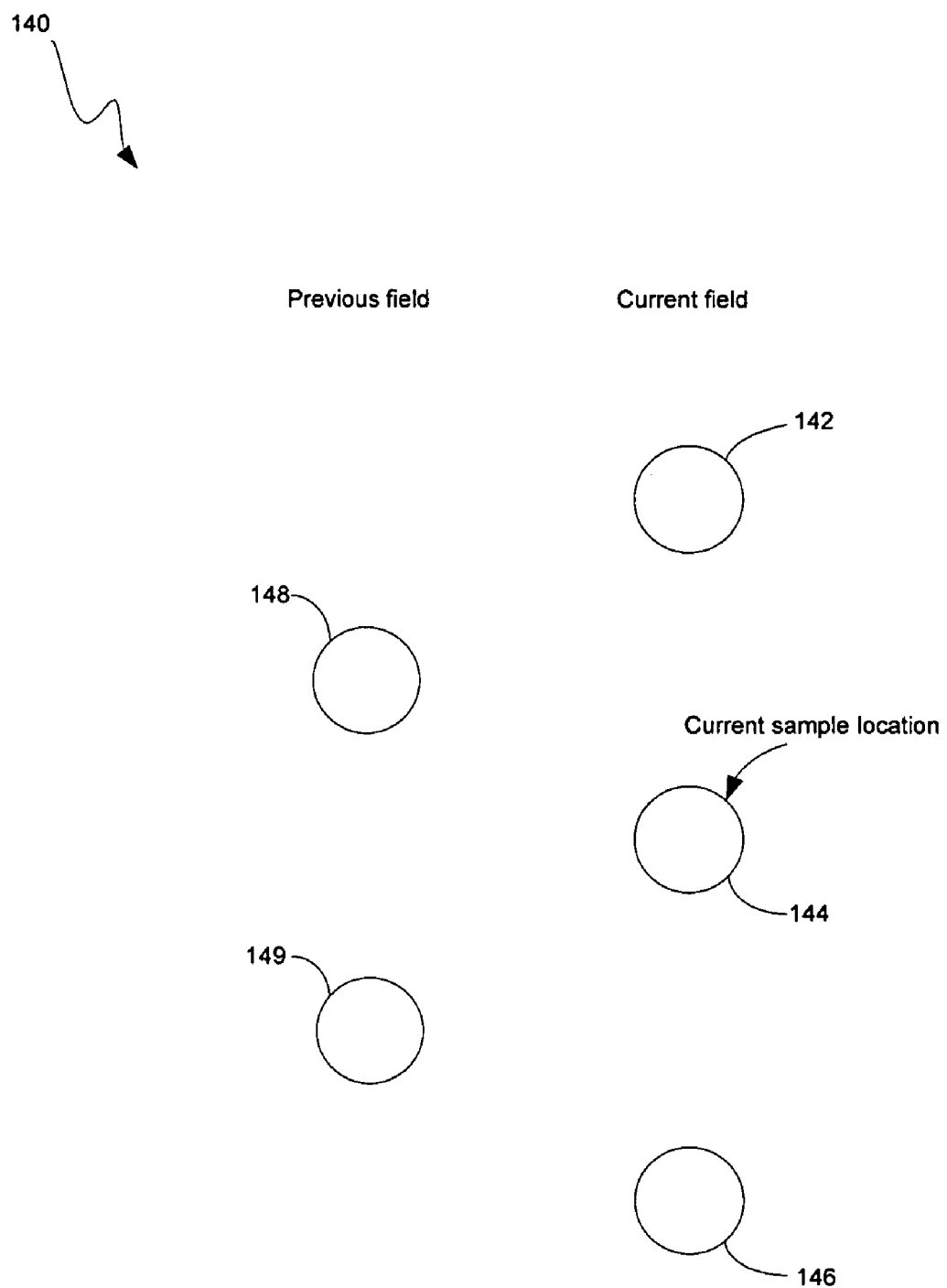
FIG. 1B is a diagram illustrating a plurality of samples for polarity change count (PCC) measurement, in accordance with an embodiment of the invention.
Figure 5:
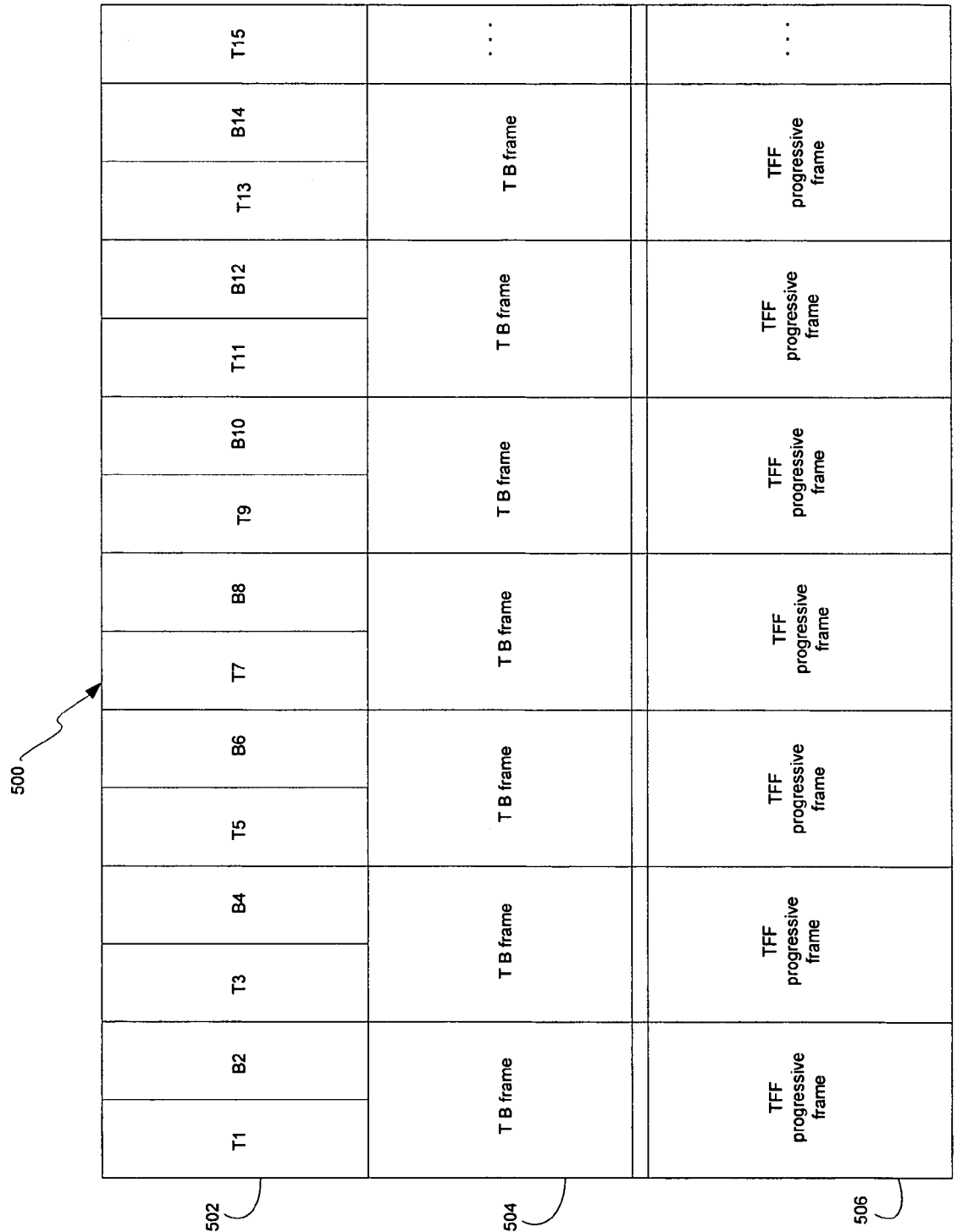
FIG. 5 is a diagram illustrating the desired decisions of the ITFP scheme for 2:2 pulldown video content with top field first (TFF), in accordance with an embodiment of the invention.

FIG. 1B is a diagram illustrating a plurality of samples for polarity change count (PCC) measurement, in accordance with an embodiment of the invention. Referring to FIG. 5, there is shown 5 samples 142, 144, 146, 148 and 149 that may be arranged as 3 samples 142, 144 and 146 from the current field and 2 samples 148 and 149 from the previous field.

U.S. patent application Ser. No. 11/254,450 filed Oct. 20, 2005, issued as U.S. Pat. No. 7,791,673 on Sep. 7, 2010 discloses a method and system for polarity change count and is hereby incorporated herein by reference in its entirety.

In accordance with an embodiment of the invention, a method for detecting a weave artifact in the ITFP by counting the number of reversals of the difference polarity (DP) between successive lines within a column of samples may be referred to as polarity change count (PCC). The PCC method may be adapted to function as a sensitive and reasonably accurate frequency detector that may detect the presence of 1.0 pi signals within a column of samples, for example, five samples.

Figure 1C:
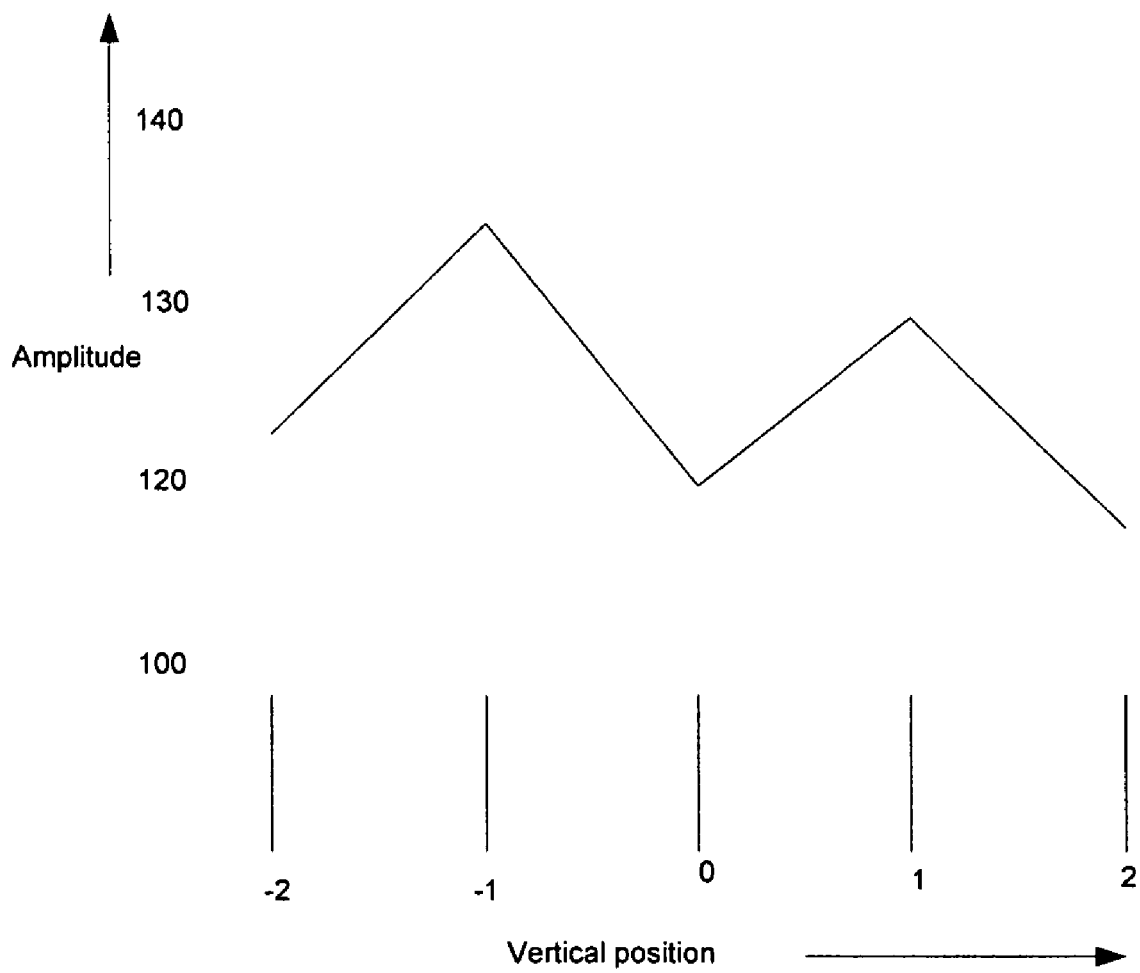
FIG. 1C is a diagram illustrating a plurality of column sample values with weave artifacts for polarity change count (PCC) measurement, in accordance with an embodiment of the invention.

FIG. 1C is a diagram illustrating a plurality of column sample values with weave artifacts for polarity change count (PCC) measurement, in accordance with an embodiment of the invention. Referring to FIG. 1C, there is shown a graph 150 illustrating PCC measurement. The general trend of the samples within this column is downward or darker, for example, while a distinct pattern of alternating up and down relative values may be present. The goal of the PCC method is to detect this up and down pattern and distinguish it from valid detail. For example, the difference polarity (DP) may alternate every sample. As a result, with 5 samples, there may be 4 DPs and 3 consecutive alternations in the DP values. Hence the PCC value in this example is 3.

The sample numbering scheme is [−2, 2] with location 0 being the location of the current sample. Samples (−2, 0, 2) may be from the current field, for example, and samples (−1, 1) may be from the previous field, for example. The PCC result for any given column of 5 samples may be one of 4 possible values: {0, 1, 2, 3}. In an exemplary embodiment of the invention, when counting the number of polarity changes, only consecutive polarity changes are counted.

A pure polarity of difference measurement may be inherently sensitive to noise such that a high PCC value may result even when the content does not have any component at 1.0 pi. The PCC method may incorporate a coring function to eliminate the effects of small noise values on the PCC results. If a given difference value between adjacent lines is less than the coring value, that difference may be ignored and may be considered not to have a determinable difference polarity. The sample pairs where the difference polarity is indeterminate may not contribute to the PCC count. In an exemplary embodiment of the invention, a column of 5 samples with at least one instance of a difference magnitude less than the PCC coring value may not result in a PCC count of 3, for example.

In an exemplary embodiment of the invention, the set of samples included in the difference polarity changes that may be utilized to determine the PCC value are consecutive and include the center sample. The differences that exceed the coring value are considered. Referring to FIG. 1C, the consecutive and center sample requirements may be met by using a column of 5 consecutive samples. A PCC value of 3 may be a strong indicator of the presence of a 1.0 pi signal exceeding the coring value. The PCC values of 0 or 1 may indicate no significant 1.0 pi signal. A PCC value of 2 may indicate that some 1.0 pi signal may be present.

The coring value may be set to 4, for example, in both luma and chroma, which may be significantly greater than the standard deviation of random noise with the signal to noise ratio (SNR) values typical of analog video. Notwithstanding, different values of coring may be utilized by the ITFP structure 100, which is illustrated in FIG. 1D.

The PCC calculation may consider two adjacent columns of samples. In an exemplary embodiment of the invention, the PCC value may be equal to 3 when both a current column and a column to its immediate left both have PCC values equal to 3 and columns have the same pattern of difference polarities. For example, in an exemplary embodiment, the number of instances of PCC values equal to 3 may be totaled for each field. This total may be referred to as the PCC3 value. A field may be considered to fit well with its corresponding adjacent field when its PCC3 value is below a threshold, referred to as a PCC3 threshold. For example, the PCC3 threshold may be set to a percentage of the number of pixels in a field, such as 0.5%.

A calculation of the degree of difference or similarity between two fields of the same polarity such as top or bottom fields may be referred to as the sum of cored absolute difference (SCAD) value. The SCAD value may compare a current field with the field that preceded it by two field intervals. The total number of instances where the differences exceed the coring value, and the comparison of the SCAD value of each field with a threshold, which may be a percentage of the total number of pixels in a field may be utilized to calculate the SCAD value. A decision algorithm may incorporate the PCC3 values and SCAD values of each of a small number of fields, and decide whether the current video signal represents a 3:2 pulldown pattern. If the current video signal represents a 3:2 pulldown pattern, the decision algorithm decides whether the current field should be coded as a field picture or alternatively whether it should be combined with its corresponding adjacent field, for example, the preceding field and the combination may be coded as a frame using progressive coding tools.

Figure 1D:
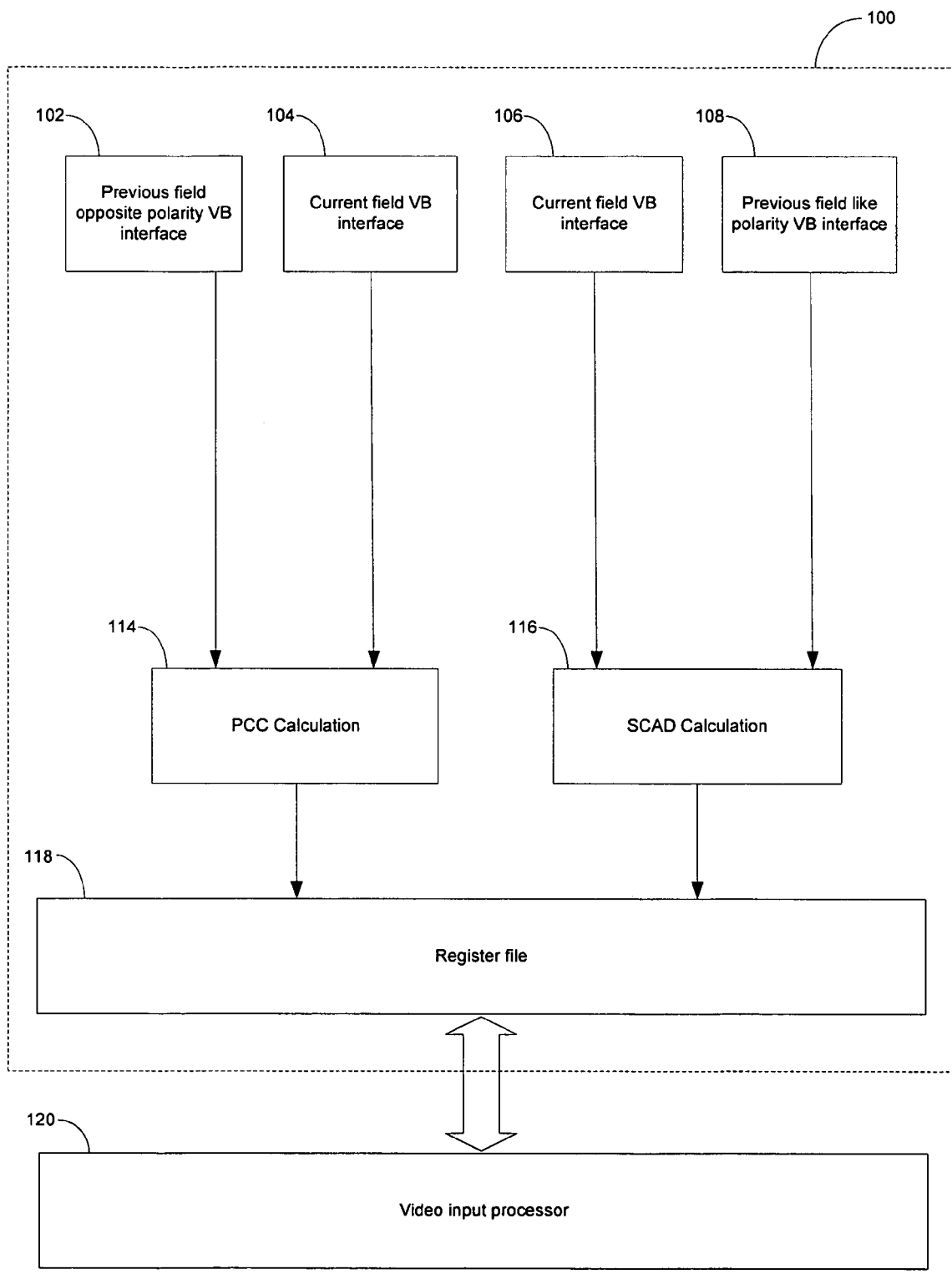
FIG. 1D is a block diagram of an exemplary structure illustrating inverse telecine and field pairing (ITFP), in accordance with an embodiment of the invention.

FIG. 1D is a block diagram of an exemplary structure illustrating inverse telecine and field pairing (ITFP), in accordance with an embodiment of the invention. Referring to FIG. 1D, there is shown the ITFP structure 100 and a video input processor (VIP) 120. The ITFP structure 100 may comprise a previous field opposite polarity video bus (VB) interface block 102, a plurality of current field video bus (VB) interface blocks 104 and 106, a previous field like polarity VB interface block 108, a polarity change count (PCC) calculation block 114, a sum of cored absolute differences (SCAD) calculation block 116 and a register file block 118.

The previous field opposite polarity VB interface block 102 and the current field VB interface block 104 provide input signals to the PCC calculation block 114. The previous field like polarity VB interface block 108 and the current field VB interface block 106 provide input signals to the SCAD calculation block 116. The PCC calculation block 114 may comprise suitable logic, circuitry and/or code that may be adapted to calculate the PCC value as described with respect to FIG. 1B and FIG. 1C.

The SCAD calculation block 116 may comprise suitable logic, circuitry and/or code that may be adapted to calculate or determine the SCAD value based on the received inputs from the previous field like polarity VB interface block 108 and/or the current field VB interface block 106. The SCAD calculation block 116 may be adapted to calculate the like-polarity field differences. The sum of cored absolute differences (SCAD) is the sum of cored absolute differences over all pixels in a field. The current field may be compared, sample by sample, with the field that occurred two fields earlier, which is of the same polarity. A register input to the SCAD calculation block 116 is a coring value that may be utilized to eliminate the effect of small differences in the result. The SCAD coring value may be programmable with different values for luma and chroma components. In case of noise-free video, the SCAD scheme may be adapted to detect 3:2 patterns in video in which there is virtually no motion. In noisy video, the SCAD scheme may be adapted to detect 3:2 patterns in video with normal amounts of motion. The SCAD measurement may be utilized to detect small amounts of 60 i or 30 p motion content composited with 3:2 pulldown video, where the use of the repeat first field (RFF) mechanism in video encoding might result in visible temporal artifacts.

The VIP 120 may comprise suitable logic, circuitry and/or code that may be adapted to receive the outputs of the PCC calculation block 114 and the SCAD calculation block 114 via a bus interface. The VIP 120 may be adapted to build a data structure from data received from the PCC calculation block 114 and the SCAD calculation block 116. The VIP 120 may comprise software that may be adapted to make decisions based on the outputs of the PCC calculation block 114 and the SCAD calculation block 116 and deliver information to an encoding process. The VIP 120 may comprise software that may be adapted to maintain a pipeline, for example, four fields measured by the PCC calculation block 114 and/or the SCAD calculation block 116 before ITFP decisions are made. The VIP 120 may be adapted to indicate to the PCC calculation block 114 whether the current field is a top field or a bottom field in order to determine how to weave the two corresponding adjacent fields. The ITFP structure 100 may be adapted to update its internal registers immediately after completion of processing a field. The VIP 120 may be adapted to read the register contents from the register file block 118 during the next field time.

The ITFP structure 100 may comprise suitable logic, circuitry and/or code that may be adapted to minimize overall hardware cost and dynamic random access memory (DRAM) real time bandwidth requirements. The video output from a noise reduction (NR) function in a video pre-processor (VPP) may be stored in field buffers. The VIP 120 may be adapted to dynamically read fields of video, either singly or in pairs and combine pairs of fields into frames.

In accordance with an embodiment of the invention, the ITFP structure 100 may be adapted to create a meta-data descriptor associated with each video field. The meta-data descriptor may include the information necessary for firmware or software to make correct decisions of field pairing to form frames, for example, interlaced or progressive coding of frames, and telecine patterns. In instances when a decision is made not to pair a field with an adjacent field, the video encoder may be adapted to code the field as a dangling field, also referred to as a single field, in case of advanced video coding (AVC), for example, or the field may be dropped in case of MPEG-2, for example, by using the repeat first field (RFF) function of MPEG-2 or the equivalent function in AVC. A pair of fields may be either top field first (TFF) or bottom field first (BFF). The ITFP structure 100 may be adapted to measure fields of video and provide these measurements to a decision making algorithm that determines how the encoder handles them.

The video processed by the NR functions and the ITFP measurement functions in the VPP may be in 4:2:2 format, for example. The conversion of the video to 4:2:0 format may be performed after the field pairing and progressive/interlace decisions are made. The 4:2:0 conversion may follow the respective field or frame definition of 4:2:0 depending on the field pairing decisions. For example, fields that are decided to be coded as field pictures may be converted from 4:2:2 to 4:2:0 following the field picture definition of 4:2:0, and pairs of fields that are decided to be coded as frame pictures may be converted from 4:2:2 to 4:2:0 following the frame picture definition of 4:2:0. The ITFP structure 100 may be adapted to utilize line buffers to store the set of samples for performing the adjacent field comparisons. A plurality of line buffers may be utilized, for example, 2 line buffers for a current field and 1 line buffer for an immediately previous field to generate a 5-sample vertical column across the two fields for PCC measurement.

Figure 1E:
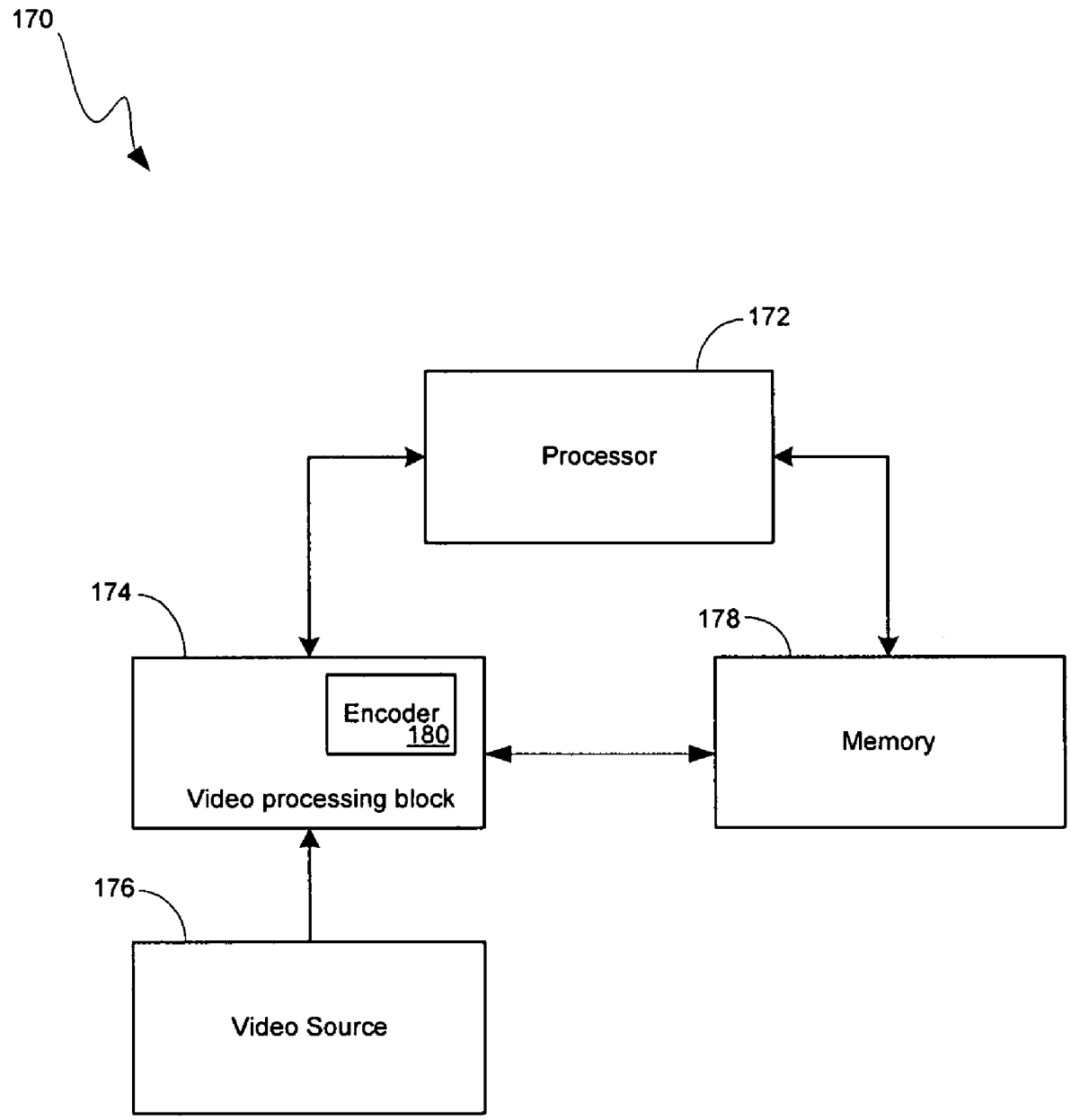
FIG. 1E is a block diagram of an exemplary system for comparing pixels, in accordance with an embodiment of the invention.

FIG. 1E is a block diagram of an exemplary system for comparing pixels, in accordance with an embodiment of the invention. Referring to FIG. 1E, the exemplary system 170 may comprise a processor 172, a video processing block 174, memory 178, and a video source 176. The video processing block 174 may comprise an encoder 180. The video source 176 may comprise suitable circuitry, logic, and/or code and may be adapted to communicate raw video stream data to the video processing block 174. The video processing block 174 may comprise suitable circuitry, logic, and/or code and may be adapted to process the raw video data received from the video source 176. For example, the video processing block 174 may be adapted to perform inverse telecine and field pairing operations on interlaced video data received from the video source 176. In this regard, the video processing block 174 may be implemented as a specialized video processing chip. The encoder 180 may comprise suitable logic, circuitry and/or code that may be adapted to encode the plurality of fields of alternating polarity based on a decision by the processor 172. Such a decision may be based at least in part on a calculated polarity change count (PCC) value. The PCC value may be calculated by the video processing block 174. The video processing block 174 may also calculate a sum of cored absolute differences (SCAD) value. A decision by the processor 172 may be based at least in part on both the PCC value and the SCAD value.

The processor 172 may comprise suitable circuitry, logic, and/or code and may be adapted to control processing of video information by the video processing block 174, for example. The processor 172 may comprise a system or a host processor. The memory 178 may be adapted to store raw or processed video data, such as video data processed by the video processing block 174. Furthermore, the memory 178 may be utilized to store code that may be executed by the processor 172 in connection with video processing tasks performed by the video processing block 174. For example, the memory 178 may store code that may be utilized by the processor 172 and the video processing block 174 for calculating a polarity change count and utilizing the calculated polarity change count during deinterlacing of interlaced video received from the video source 176.

Figure 2:
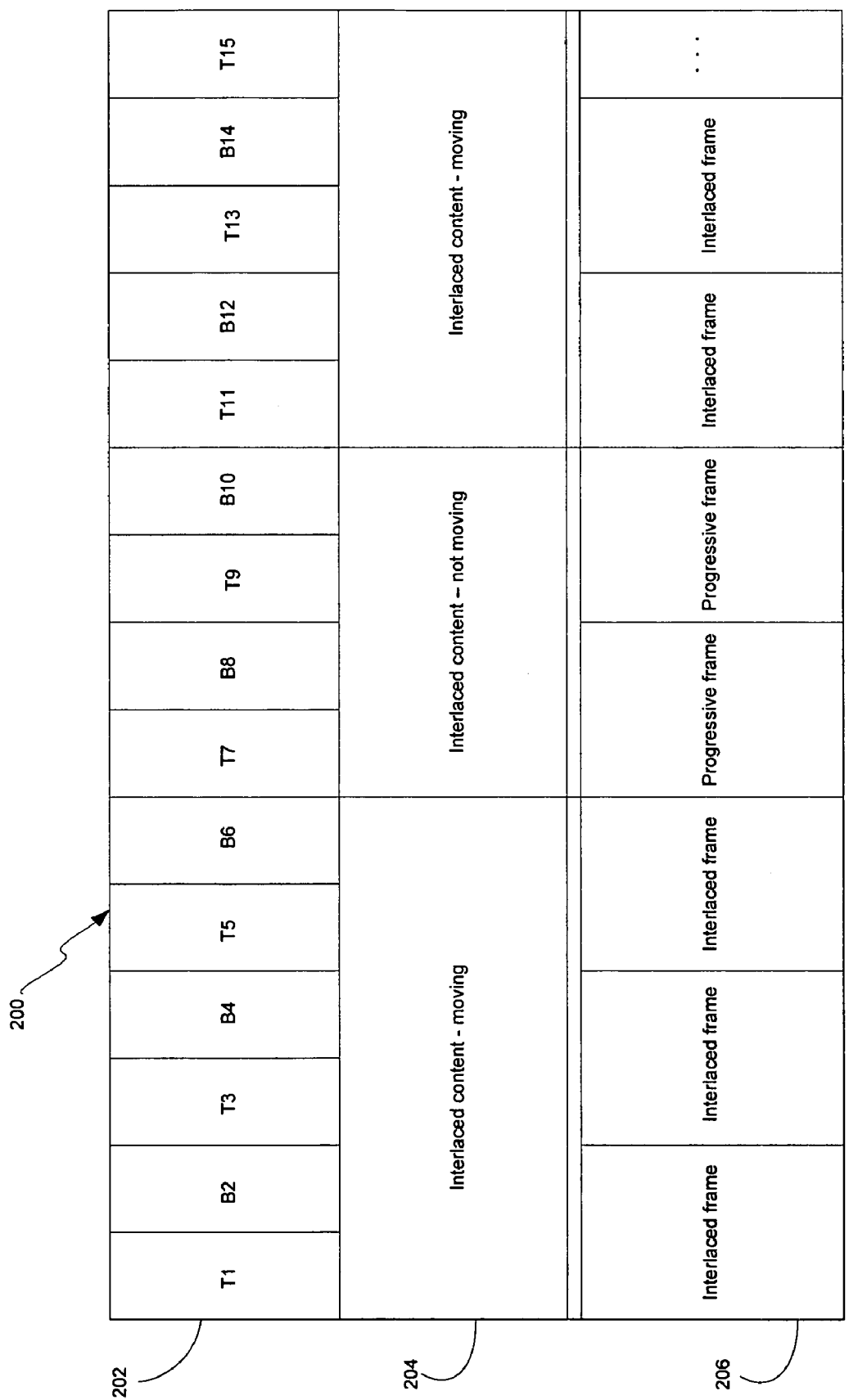
FIG. 2 is a diagram illustrating the desired decisions of the ITFP scheme for interlaced video content, in accordance with an embodiment of the invention.

FIG. 2 is a diagram illustrating the desired decisions of the ITFP scheme for interlaced video content, in accordance with an embodiment of the invention. Referring to FIG. 2, there is shown a table 200 illustrating the desired decisions of the ITFP scheme for interlaced video content. The table 200 may comprise three rows, 202, 204 and 206. The row 202 may indicate the interlaced video input sequence of fields, alternating top (T), bottom (B), T, B, and repeating. The row 204 may indicate whether the interlaced video content is moving or not moving. The row 206 may indicate the desired decisions of the ITFP scheme on the interlaced video input sequence of fields.

The interlaced video content may arrive as a sequence of fields, alternating top (T), bottom (B), T, B, and repeating. In pure interlaced video such as from an interlaced camera, there are no progressive frames. There may be two or more consecutive fields, during which there may be no motion in the content, and pairs of fields associated with such times may be coded using progressive frame coding tools. There may be no inherent TB or BT field order, with respect to constructing frames from field pairs, in this type of content. The pairing of fields into frames may be either top field first (TFF) or bottom field first (BFF) as long as the overall TBTB field pattern is consistent.

In table 200, the fields T7 through B10 are sampled from an interval with a small amount of interlaced video content motion between fields T7 and B8 and between fields T9 and B10. These pairs of fields may be efficiently encoded using progressive frame coding tools or progressive frames. The fields, T1 through B6 and T11 through T15, have significant inter-field motion and may be efficiently coded using interlaced frame coding tools or interlaced frames or field coding tools. If the ITFP structure 100 (FIG. 1D) is not able to discern reliably between the two cases of field pairs, for example, the field pairs that have a small amount of inter-field motion and the field pairs that have a significant amount of inter-field motion, then all field pairs may be coded as interlaced frames or as field pictures, for example.

Figure 3:
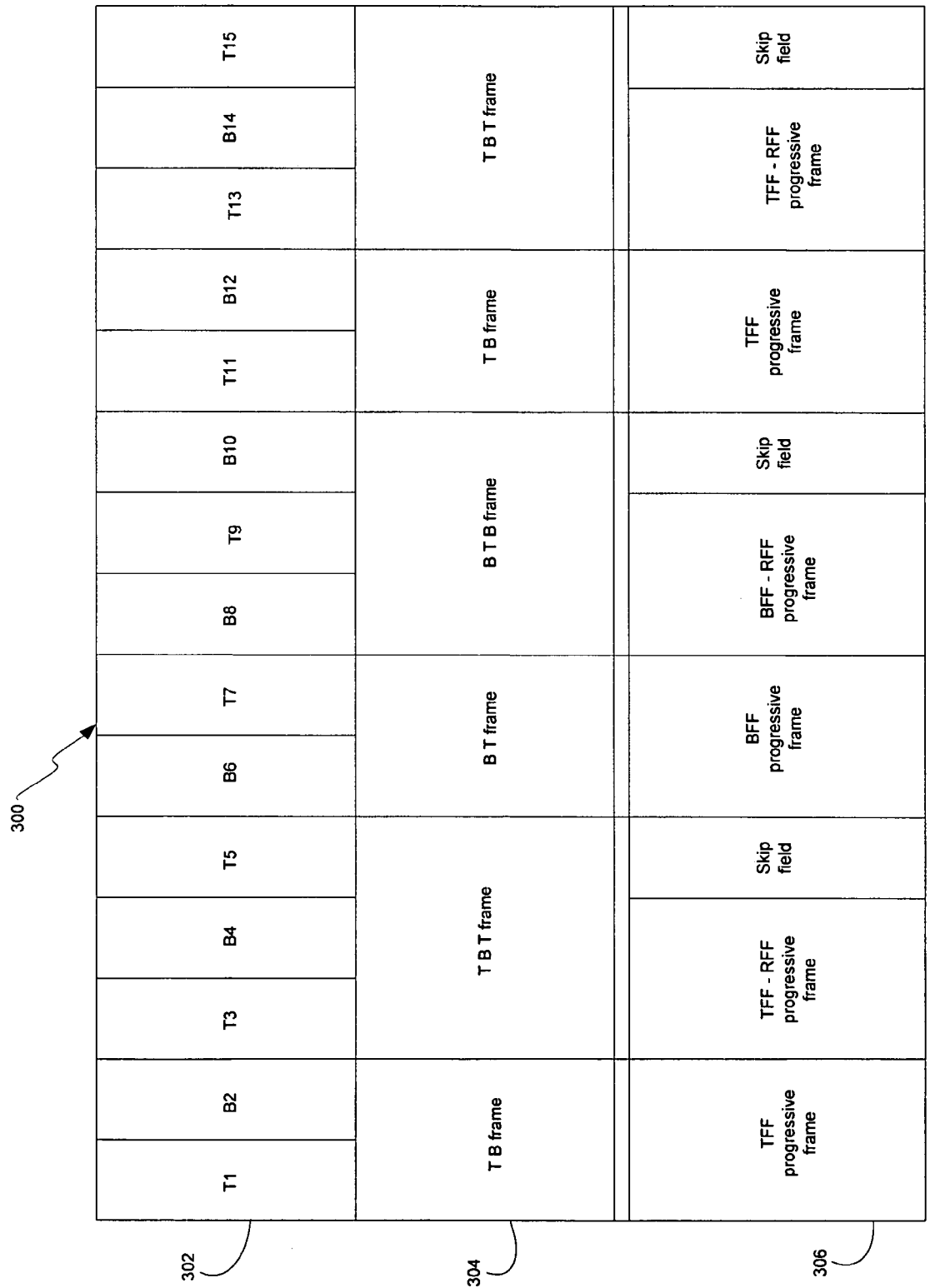
FIG. 3 is a diagram illustrating the desired decisions of the ITFP scheme for 3:2 pulldown video content, in accordance with an embodiment of the invention.

FIG. 3 is a diagram illustrating the desired decisions of the ITFP scheme for 3:2 pulldown video content, in accordance with an embodiment of the invention. Referring to FIG. 3, there is shown a table 300 illustrating the desired decisions of the ITFP scheme for 3:2 pulldown video content. The table 300 may comprise three rows, 302, 304 and 306. The row 302 may indicate the 3:2 pulldown video input sequence of fields, alternating top (T), bottom (B), T, B, and repeating. The row 304 may indicate the pairing of the 3:2 pulldown video input sequence, for example, TB frame, TBT frame, BT frame or BTB frame. The row 306 may indicate the desired decisions of the ITFP scheme on the 3:2 pulldown video input sequence of fields.

The 3:2 pulldown video content comprises progressive frames that may be represented by an alternating pattern of 2 or 3 fields of video. There is a specific field order associated with each of the progressive source frames. Each of the source frames that may repeat in a predictable pattern may be associated with at least one of four different field orders, for example, TB, TBT, BT, and BTB. These may be classified as top field first (TFF), top field first -repeat first field (TFF-RFF), bottom field first (BFF) and BFF-RFF respectively. In the case of pure 3:2 pulldown video content with no significant noise, the third field in the TBT and BTB frames is a repeat of the first field of the same frame. A sequence of 3:2 pulldown video content may start on any of the ten fields in this repeating pattern. For example, table 300 illustrates the 3:2 pulldown pattern starting with a TB frame. The ITFP structure 100 and the associated decision algorithm may detect the presence of the progressive source frames, TBT and BTB field repeat patterns, assemble the fields correctly into frames and indicate the TFF, BFF and RFF nature of each of the resulting frames.

Figure 4:
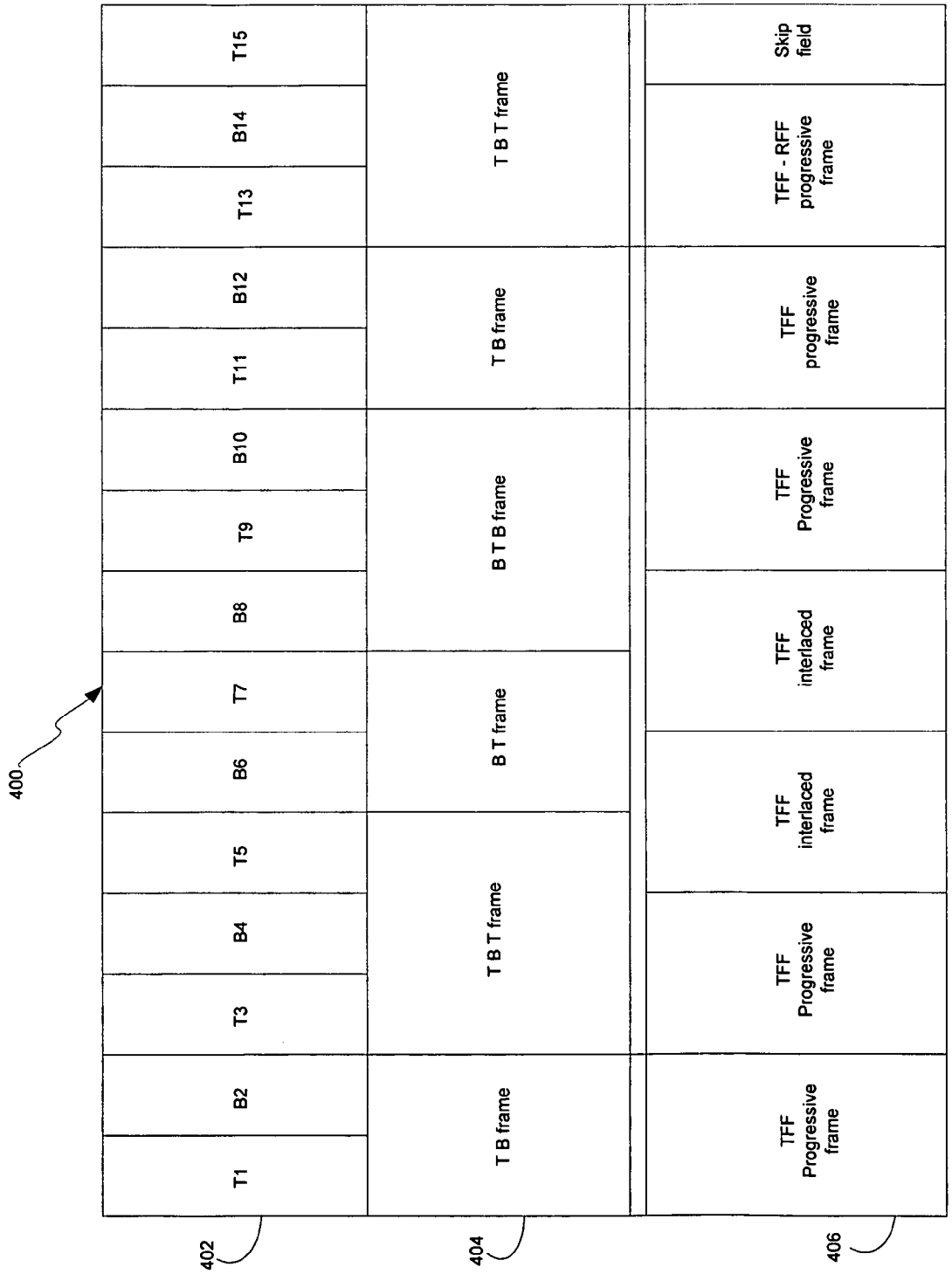
FIG. 4 is a diagram illustrating the desired decisions of the ITFP scheme for 3:2 pulldown video content with delayed detection, in accordance with an embodiment of the invention.

FIG. 4 is a diagram illustrating the desired decisions of the ITFP scheme for 3:2 pulldown video content with delayed detection, in accordance with an embodiment of the invention. Referring to FIG. 4, there is shown a table 400 illustrating the desired decisions of the ITFP scheme for 3:2 pulldown video content with delayed detection. The table 400 may comprise three rows, 402, 404 and 406. The row 402 may indicate the 3:2 pulldown video input sequence of fields, alternating top (T), bottom (B), T, B, and repeating. The row 404 may indicate the pairing of the 3:2 pulldown video input sequence, for example, TB frame, TBT frame, BT frame or BTB frame. The row 406 may indicate the desired decisions of the ITFP scheme on the 3:2 pulldown video input sequence of fields with delayed detection.

If T1 and B2 represent the start of the 3:2 pulldown video input sequence, it may not be possible in some embodiments to make the correct TFF frame decision for fields T1 and B2. If the ITFP structure 100 and the associated decision algorithm delay making the correct 3:2 pulldown decisions, it may mark some of the fields at the start of the 3:2 pulldown video input sequence as interlaced frames or progressive frames and may adjust the field pattern to accommodate the 3:2 pulldown video input sequence once it is detected. This adjustment may require either waiting for a plurality of frames until beginning to mark the frames correctly, or alternatively the introduction of an RFF frame indication, where an RFF frame may not actually exist in the video input content. Referring to table 400, the ITFP scheme does not begin marking the frames correctly according to the 3:2 pulldown pattern until fields T11 and B12.

FIG. 5 is a diagram illustrating the desired decisions of the ITFP scheme for 2:2 pulldown video content with top field first (TFF), in accordance with an embodiment of the invention. Referring to FIG. 5, there is shown a table 500 illustrating the desired decisions of the ITFP scheme for 2:2 pulldown video content with TFF. The table 500 may comprise three rows, 502, 504 and 506. The row 502 may indicate the 2:2 pulldown video input sequence of fields, alternating top (T), bottom (B), T, B, and repeating. The row 504 may indicate the pairing of the 2:2 pulldown video input sequence, for example, TB frames. The row 506 may indicate the desired decisions of the ITFP scheme on the 2:2 pulldown video input sequence of fields.

The progressive video content with a progressive frame rate of half the interlaced format field rate is known as 2:2 pulldown and may also be referred to as progressive content. The 2:2 pulldown pattern is common in 25 fps video systems such as phase alternation line (PAL) and sequential color with memory (SECAM) and may also be utilized in computer generated (CG) and digital film content in 30 fps systems such as national television standards committee (NTSC). The 2:2 pulldown video content may comprise progressive frames that may be represented as a fixed pattern of two fields of video. The fields of 2:2 pulldown video may be paired, for example, as TB for TFF and BT for BFF. Unlike 3:2 pulldown, there may not be any repeats of fields in 2:2 pulldown. A sequence of 2:2 pulldown video content may start on either of the two fields in the repeating pattern of frames. For example, in table 500 the 2:2 pulldown video pattern with a TFF order may start with a TB frame. The ITFP structure 100 and associated decision algorithm may be adapted to detect the presence of the progressive source frames, assemble the fields correctly into frames and indicate the TFF nature of each of the resulting frames.

Figure 6:
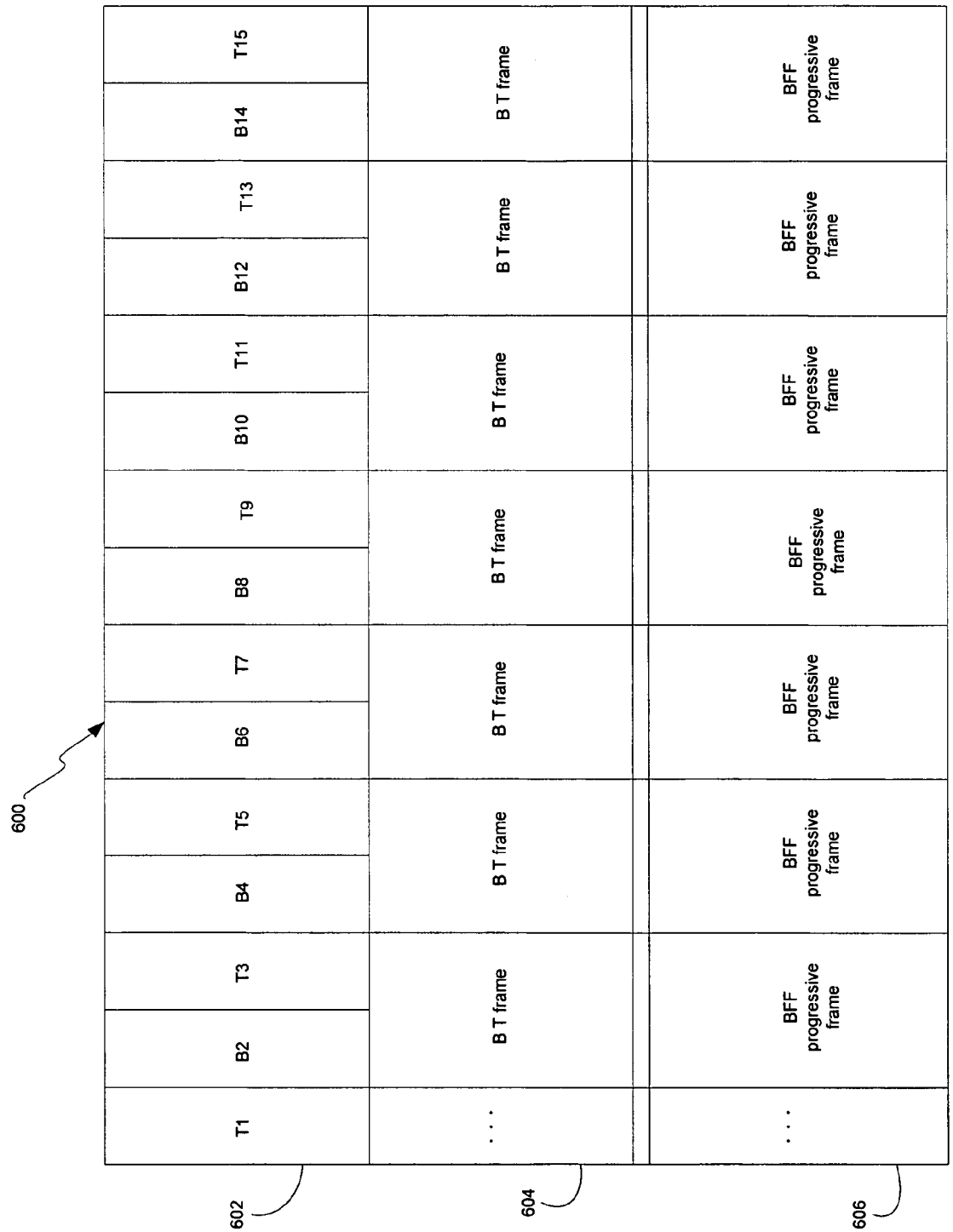
FIG. 6 is a diagram illustrating the desired decisions of the ITFP scheme for 2:2 pulldown video content with bottom field first (BFF), in accordance with an embodiment of the invention.

FIG. 6 is a diagram illustrating the desired decisions of the ITFP scheme for 2:2 pulldown video content with bottom field first (BFF), in accordance with an embodiment of the invention. Referring to FIG. 6, there is shown a table 600 illustrating the desired decisions of the ITFP scheme for 2:2 pulldown video content with BFF. The table 600 may comprise three rows, 602, 604 and 606. The row 602 may indicate the 2:2 pulldown video input sequence of fields, alternating top (T), bottom (B), T, B, and repeating. The row 604 may indicate the pairing of the 2:2 pulldown video input sequence, for example, BT frame. The row 606 may indicate the desired decisions of the ITFP scheme on the 2:2 pulldown video input sequence of fields.

If B2 and T3 represent the start of the 2:2 pulldown video input sequence, it may not be possible to make the correct BFF frame decision for fields B2 and T3 in some embodiments. If the decision algorithm delays making the correct 2:2 pulldown decisions, it may mark some of the fields at the start of the 2:2 pulldown pattern as interlaced frames or progressive frames. The decision algorithm may adjust the field pattern to accommodate the 2:2 pulldown pattern after determining the TB or BT field order. In AVC, a dangling field may be indicated in order to reverse the TB or BT order of the following fields. In MPEG-2, such an adjustment would require the introduction of an RFF frame indication, where an RFF frame may not actually exist in the video input content.

Figure 7:
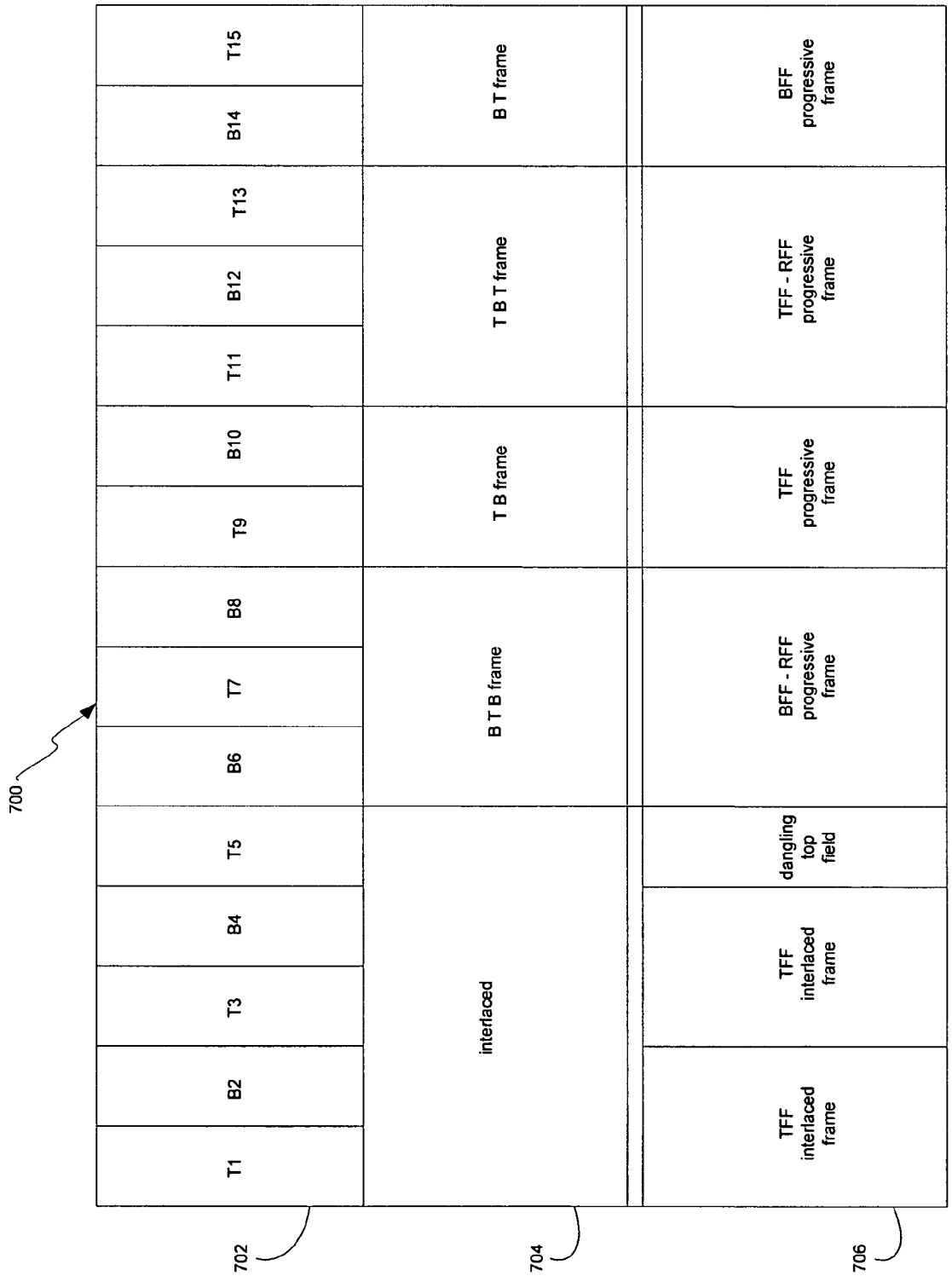
FIG. 7 is a diagram illustrating the desired decisions of the ITFP scheme for a transition from interlaced video content to 3:2 pulldown video content when used with an Advanced Video Coding (AVC) encoder, in accordance with an embodiment of the invention.

FIG. 7 is a diagram illustrating the desired decisions of the ITFP scheme for transition from interlaced video content to 3:2 pulldown video content when encoding using the Advanced Video Coding (AVC) format, in accordance with an embodiment of the invention. Referring to FIG. 7, there is shown a table 700 illustrating the desired decisions of the ITFP scheme for transition from interlaced video content to 3:2 pulldown video content in AVC. The table 700 may comprise three rows, 702, 704 and 706. The row 702 may indicate the video input sequence of fields, alternating top (T), bottom (B), T, B, and repeating. The row 704 may indicate the nature of the video input sequence, for example, interlaced video, TB frame, TBT frame, BT frame or BTB frame. The row 706 may indicate the desired decisions of the ITFP scheme on the transition from interlaced video content to 3:2 pulldown video content in AVC.

In table 700, the video input sequence format changes from interlaced to 3:2 pulldown. This transition may occur on any field of the video input sequence and the 3:2 pattern may start on any of the 10 fields of the pattern as long as the top and bottom field pattern of field polarity repeats correctly. Table 700 illustrates one of a possible 10 cases of such transitions. The interlaced video content that precedes the 3:2 video pattern may be assumed to be processed with a top field first (TFF) interlaced frame structure. Although the TFF interlaced frame pattern is expected to end on a bottom field, it actually ends on a dangling top field, followed by a 3:2 video pattern that starts with a bottom field.

Figure 8:
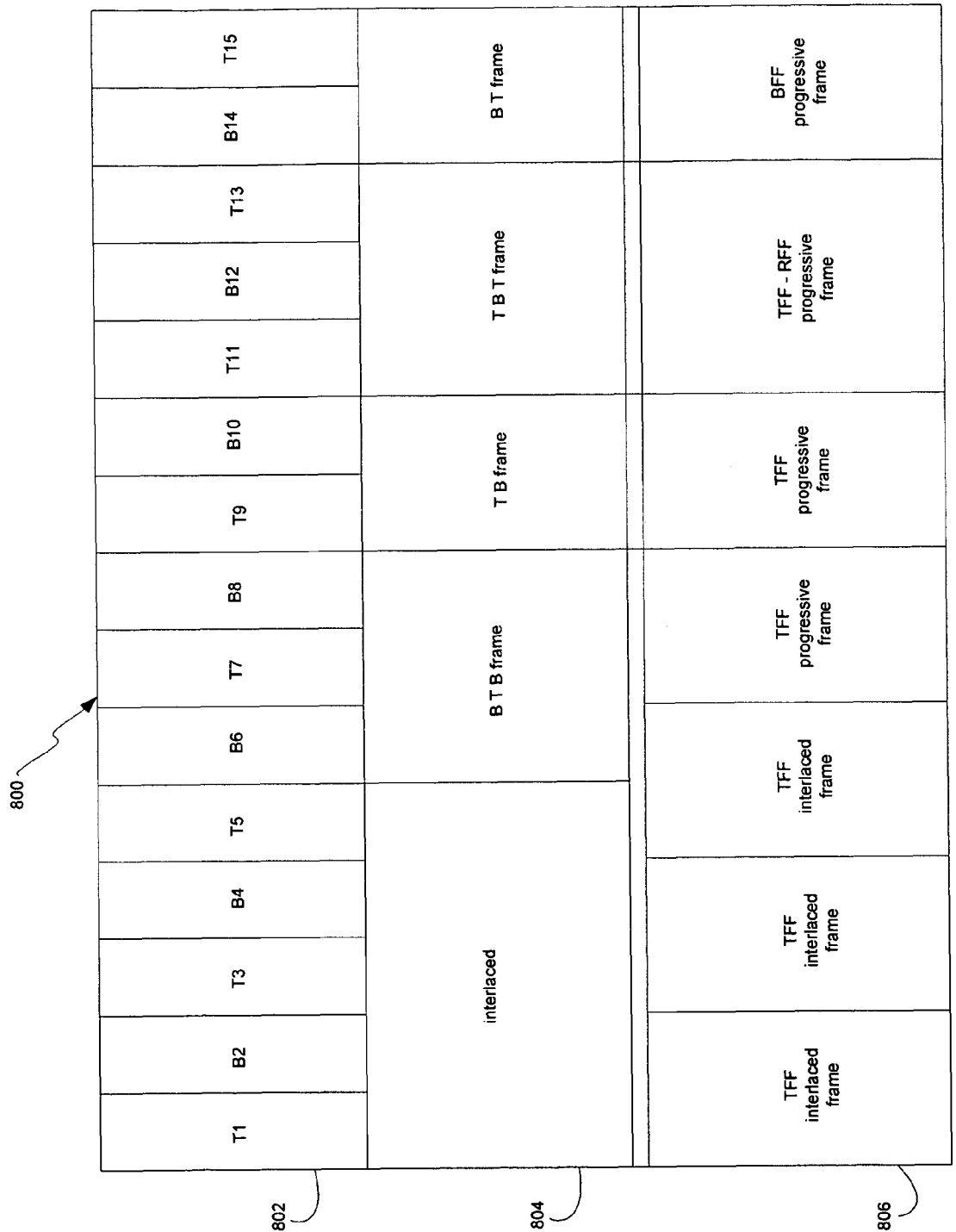
FIG. 8 is a diagram illustrating the desired decisions of the ITFP scheme for a transition from interlaced content to 3:2 pulldown content when used with an MPEG-2 encoder, in accordance with an embodiment of the invention.

FIG. 8 is a diagram illustrating the desired decisions of the ITFP scheme for transition from interlaced content to 3:2 pulldown content when encoding in the MPEG-2 format, in accordance with an embodiment of the invention. Referring to FIG. 8, there is shown a table 800 illustrating the desired decisions of the ITFP scheme for transition from interlaced video content to 3:2 pulldown video content in MPEG-2. The table 800 may comprise three rows, 802, 804 and 806. The row 802 may indicate the video input sequence of fields, alternating top (T), bottom (B), T, B, and repeating. The row

804 may indicate the nature of the video input sequence, for example, interlaced video, TB frame, TBT frame, BT frame or BTB frame. The row 806 may indicate the desired decisions of the ITFP scheme on the transition from interlaced video content to 3:2 pulldown video content in MPEG-2.

In table 800, the transition from interlaced content to 3:2 pulldown content in MPEG-2, the fields T5 from the interlaced portion may be combined with the field B6 from the 3:2 pulldown portion into an interlaced frame in order to align the top field and bottom field pattern of fields in the encoded frames. This enables the frame associated with fields T7 and B8, which are samples of a BTB frame, to be marked without the RFF indication that would normally be present for this frame. The indication of the correct 3:2 pulldown frame types may be delayed by one or more frames. The ITFP structure 100 and associated decision algorithm may indicate different frame types such as TFF interlaced frames until the 3:2 pulldown pattern is correctly identified. The ITFP structure 100 and associated decision algorithm may be adapted to mark the frames correctly while retaining the correct alternating field polarity. The ITFP structure 100 and associated decision algorithm may be adapted to mark a frame with RFF when the input does not have a repeated first field in order to match the 3:2 cadence of the input and the TBTB field pattern.

Figure 9:
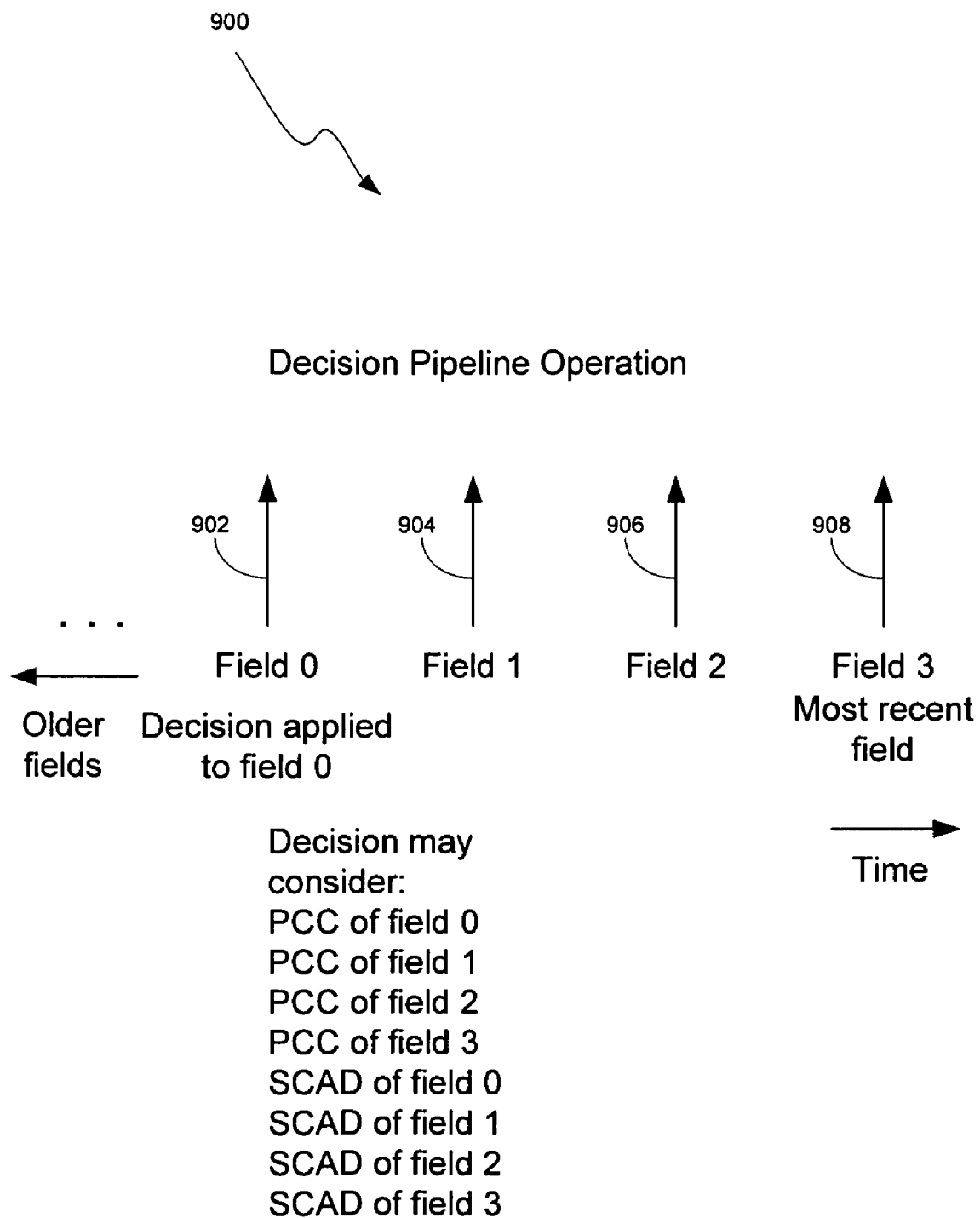
FIG. 9 is a diagram illustrating pipelining of the plurality of fields of alternating polarity, in accordance with an embodiment of the invention.

FIG. 9 is a diagram illustrating pipelining of the plurality of fields of alternating polarity, in accordance with an embodiment of the invention. Referring to FIG. 9, there is shown the decision pipeline operation 900. The decision pipeline operation 900 may comprise receiving a plurality of fields, field 0 902, field 1 904, field 2 906 and field 3 908 in a sequential order.

The inputs to the decision pipeline operation 900 may be_input field number, input field polarity, input_field_pcc3 and input_field_scad. The input field number may start from 0 as the first input video field, for example. The input field polarity may be defined as the polarity of a newly arrived video field, for example, a TOP_FIELD or a BOTTOM_FIELD. The input_field_pcc3 may be defined as the incidence of PCC=3 within the input field, for example. The input_field_scad may be defined as the sum of cored absolute difference value of the input video field.

The outputs of the decision pipeline operation 900 may be_output field number, output field polarity, output field order and output picture type. The output field number may be defined as the field number of the output field with ITFP status marked. The output field polarity may be defined as the polarity of the output field with ITFP status marked, TOP or BOTTOM, for example. The output field order may be defined as the display order, with range of {1, 2, 3}, of the output field in the frame, for example. The output picture type may be defined as the type of the picture to which the output field belongs, for example, progressive frame, interlaced frame, progressive repeat first field (RFF) frame, single field or skipped field.

When the output field is marked to belong to either a progressive frame or an interlaced frame type of picture, there are two fields, with opposite field polarities and output field order values 1 and 2, in a frame, for example. The frame may be either top field first (TFF) or bottom field first (BFF) depending on the output field polarity and output field order information. When the field with output field order equal to 1 has a top field polarity, the frame is a TFF frame. When the field with output field order equal to 1 has a bottom field polarity, the frame is a BFF frame.

When the output field is one of the first two fields of a 3-field frame in a 3:2 pull-down video sequence, for example, the field is marked to have a progressive RFF frame picture type. The third field of this 3-field frame is identical to the first field in the frame and is marked to have a skipped field picture type as it may be skipped by the encoder and re-constructed in a decoder by repeating the first field of the 3-field frame, for example. For a field marked with single field picture type, the field may not belong to any frame. It may be either top field or bottom field depending on the output field polarity. Such a field may be coded as a dangling field in AVC, for example.

The decision pipeline operation 900 may operate as a four field pipeline. The newly arrived input video field may be marked as field 3 908 and the current field for which the ITFP information is derived may be marked as field 0 902. Once the ITFP information including the parameters frame type and field order are derived for field 0 902, the pipeline may be updated as follows. The parameters of a data structure of field 1 904 may be copied to the data structure of field 0 902. The parameters of a data structure of field 2 906 may be copied to the data structure of field 1 904. The parameters of a data structure of field 3 908 may be copied to the data structure of field 2 906.

The threshold parameters utilized in the decision pipeline operation 900 are PCC3_THD and SCAD_THD. The PCC3_THD threshold value may be defined as the threshold of the PCC=3 value. When the value of the field_pcc3 variable of a particular field is smaller than this threshold, this particular field and the field preceding it may be paired together as a progressive frame. The SCAD_THD threshold value may be defined as the threshold of the sum of cored absolute differences (SCAD) value. When the value of the field SCAD variable of a particular field is smaller than this threshold, this particular field may be considered identical to the most recent like-polarity field, for example, the field that is two fields earlier than the particular field.

The operational states of the decision pipeline operation 900 may be NORMAL_TFF, NORMAL_BFF, and THREE_TWO, for example. When current state is NORMAL_TFF or NORMAL_BFF, the video fields may be considered either part of interlaced frames or progressive frames and each frame may start with a top field or bottom field respectively by default. The field order variable may toggle between the value 1 for the first field in display order in a frame or 2 for the second field in display order of a frame, for example. Upon receiving a new video field, the decision pipeline operation 900 may check if a 3:2 pattern is detected, if a transition to bottom field first sequence or to top field first sequence is needed and whether the field belongs to a progressive frame or interlaced frame.

The operational state may be changed to THREE_TWO if a 3:2 pattern is detected and changed between NORMAL_TFF and NORMAL_BFF if a transition between top field first sequence and bottom field first sequence is needed. A dangling field may be generated as the result of state change, which may be indicated by marking the output field as a single field. When current state is THREE_TWO for the 3:2 pull down pattern, the video fields may be considered to be part of progressive frames. Each progressive frame may have either three fields with field order values from 1 to 3, for example, or two fields with field order value 1 or 2, for example. In the three-field case, the first two fields of the frame may be marked to have picture type progressive RFF frame while the last one field of the frame may be marked to be a skipped field. In the two-field case, the two fields may be marked to have picture type progressive frame.

Upon receiving a new video field, the decision pipeline operation 900 may check if the 3:2 pattern is disrupted. If the new video field is supposed to be the third field of a 3-field frame and the SCAD value of the field exceeds the SCAD threshold value, SCAD_THD, the new video field is marked to be a single field while the operational state is in THREE_TWO state. If the 3:2 pattern is broken because the PCC values exceed the PCC threshold, PCC3_THD, the operational state may be changed to either NORMAL_TFF or NORMAL_BFF depending on the current field polarity. A dangling field may be generated as the result of the state change.

Figure 10:
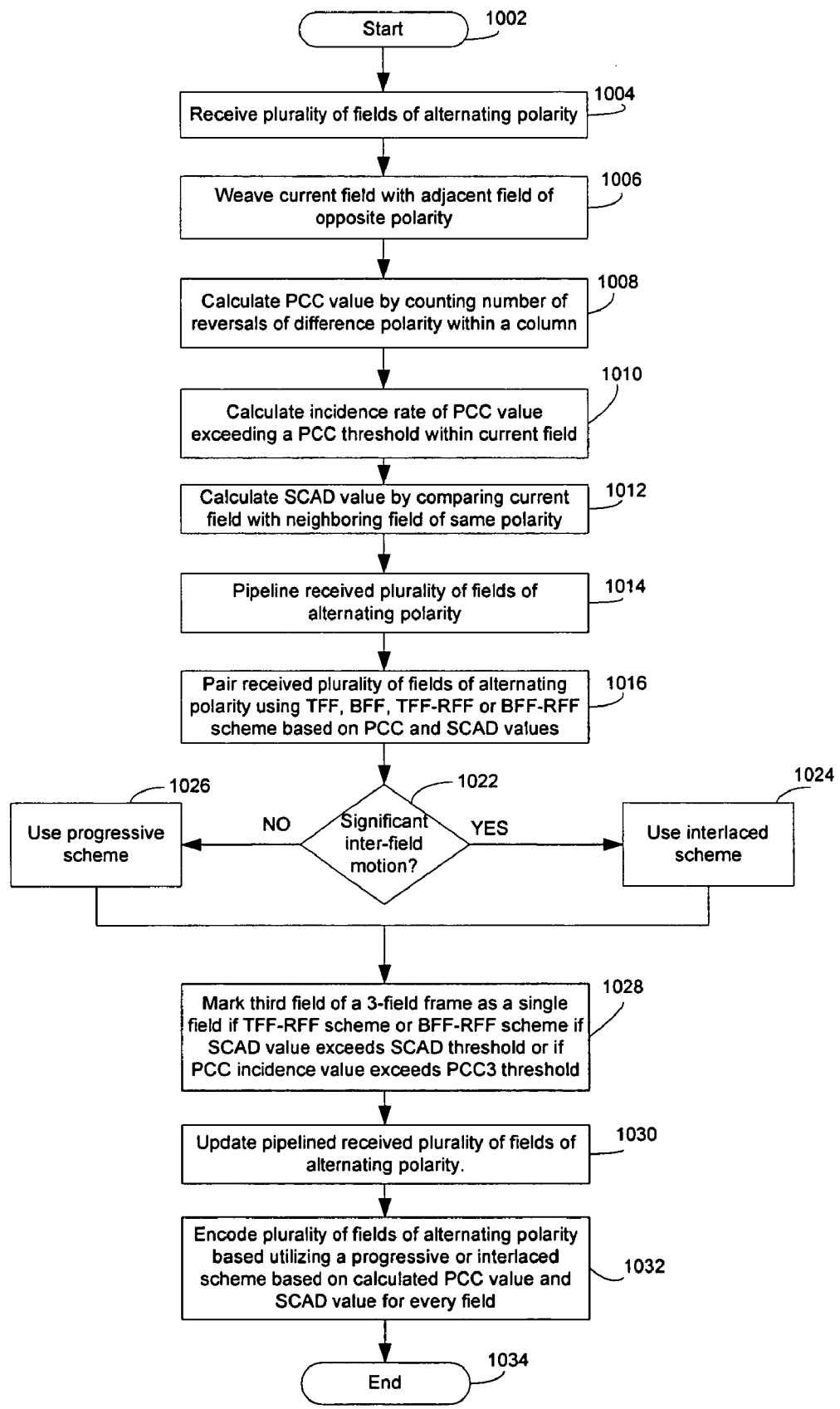
FIG. 10 is a flowchart illustrating exemplary steps that may be utilized for inverse telecine and field pairing, in accordance with an embodiment of the invention.

FIG. 10 is a flowchart illustrating exemplary steps that may be utilized for inverse telecine and field pairing, in accordance with an embodiment of the invention. Referring to FIG. 10, the exemplary steps may begin at step 1002. In step 1004, a plurality of fields of alternating polarity may be received. In step 1006, the current field may be weaved with its adjacent field of opposite polarity. In step 1008, the PCC value may be calculated by counting a number of reversals of a difference polarity between the current field and the adjacent field within a column of samples. In step 1010, the incidence rate of the PCC value exceeding a PCC threshold within the current field may be calculated. In step 1012, a sum of cored absolute differences (SCAD) value may be calculated by comparing the current field with a neighboring field of same polarity. In step 1014, the received plurality of fields of alternating polarity may be pipelined to improve coding efficiency and to minimize visible artifacts. In step 1016, at least one of: top field first (TFF) scheme, bottom field first (BFF) scheme, top field first-repeat first field (TFF-RFF) scheme and bottom field first-repeat first field (BFF-RFF) scheme may be utilized to pair the received plurality of fields of alternating polarity based on the calculated PCC and SCAD values.

In step 1022, it may be determined whether there is significant inter-field motion. If there is significant inter-field motion between paired fields, control passes to step 1024. In step 1024, a decision may be made to utilize an interlaced scheme to encode the received plurality of fields of alternating polarity. Control then passes to step 1028. If there is no significant inter-field motion between paired fields, control passes to step 1026. In step 1026, a decision may be made to utilize a progressive scheme to encode the received plurality of fields of alternating polarity. Control then passes to step 1028. In step 1028, the decision pipeline operation may check if the 3:2 pattern is disrupted. The third field of a three field frame may be marked as a single field if the either the TFF-RFF scheme or MFF-RFF scheme is being utilized and the SCAD value of the field exceeds the SCAD threshold value or if the PCC incidence value exceeds the PCC3 threshold value. In step 1030, the pipelined received plurality of fields of alternating polarity may be updated. In step 1032, the plurality of fields of alternating polarity may be encoded based on utilizing a progressive scheme or an interlaced scheme based on a calculated PCC value and SCAD value for each field. Control may then pass to end step 1034.

The ITFP structure 100 (FIG. 1D) and associated decision algorithm may be adapted to eliminate visible artifacts that may be caused by making incorrect decisions in encoding the incoming video. Accordingly, the ITFP structure 100 and associated decision algorithm may be adapted to maximize the compression efficiency of the associated video encoder core. For instance, where there is inter-field motion between two adjacent fields, a combined frame of the two adjacent fields tends to have spurious details that may result from the inter-field motion and from lighting changes. These spurious details may be similar to the "bad weave" artifacts in de-interlacers. In a de-interlacer, the bad weave artifacts may be visible in a progressive video output. However, in the case of encoding, a frame composed of two adjacent fields may be correctly compressed as a progressive frame, decompressed and displayed as an interlace frame even if there is inter-field motion. A de-interlacer may need to maximize the vertical resolution while minimizing weave artifacts at every sample. The ITFP scheme, on the other hand, may need to make the field pairing and frame structure decision once for every field, not once per sample. When the ITFP is used in conjunction with encoding of interlaced video, the resulting encoded stream and subsequent decoded video may be considered to be interlaced and suitable for interlaced display, in contrast to the progressive display output that may be typical of a de-interlacer.

An artifact may occur when the input content is determined to be 3:2 pulldown and there is some inter-field motion between the first and third fields of a TBT frame or a BTB frame. When using the RFF function for the 3:2 pulldown coding in MPEG-2 or the equivalent function in AVC, the third or first field of these frames may be dropped before encoding. After decoding, the dropped field may be replaced by replicating the field of the same polarity from the same frame. For example, with 60 Hz interlaced animated graphics such as a scrolling ticker composited with 3:2 pulldown content, every fifth field may be dropped and replaced by another field. When displaying decoded version of such video, this may result in intermittent retrograde motion of the animated graphics that may appear jerky. The ITFP scheme may minimize or eliminate such artifacts by detecting the presence of inter-field motion or of differences between the first and third fields of TBT and BTB frames, and either indicating that the two fields of the same polarity should both be coded or indicating that the 3:2 pulldown pattern has ended. In some video coding formats such as AVC, single fields such as the $3^{rd}$ field of a BTB or TBT frame may be coded, while also coding the first two fields of such frames as a progressive frame.

The ITFP scheme may be adapted to measure how well two adjacent fields would "fit" together when combined into one progressive frame by measuring the weave artifacts that might result if the two fields were woven together. The "fit" may be a measure of the visible artifacts resulting from inter-field motion in the progressive frame or pair of fields. The fit measurement is effective for addressing the requirements of the ITFP scheme, for example, for detecting 3:2 pulldown patterns, detecting 2:2 pulldown patterns for TFF or BFF, detecting exceptions to telecine patterns such as animated CG, detecting transitions between these patterns and interlace and determining whether any given pair of fields may be more effectively compressed as a progressive frame or an interlaced frame.

The degree to which two adjacent fields might fit when combined into one frame and coded as a progressive frame may be estimated by measuring the bad weave artifacts that would occur in such a progressive frame. The PCC method may be adapted to detect bad weave artifacts that might result if two fields sampled from different times with inter-field motion or lighting changes are combined into one progressive frame. The PCC function may be adapted to generate a PCC value for every sample in a frame. The determination of whether a given pair of fields fit well may be based on the number of samples in a field where the PCC value, for example, PCC value of 3 is high enough to indicate the presence of weave artifacts.

In another embodiment of the invention, a system for processing video data may comprise at least one processor, for example, processor 172 that may be adapted to receive a plurality of fields of alternating polarity. The interlaced video content may arrive as a sequence of fields, alternating top (T), bottom (B), T, B, and repeating. In pure interlaced video such as from an interlaced camera, there are no progressive frames.

There may be two or more consecutive fields, during which there may be no motion in the content, and pairs of fields associated with such occurrences may be coded efficiently using progressive frame coding tools. There may be no inherent TB or BT field order, with respect to constructing frames from field pairs, in this type of content. The pairing of fields into frames may be either top field first (TFF) or bottom field first (BFF) as long as the overall TBTB field pattern is consistent.

At least one processor, for example, processor 172 may be adapted to weave a current field with its corresponding adjacent field of opposite polarity. At least one processor, for example, processor 172 may comprise suitable logic, circuitry and/or code that may be adapted to calculate a polarity change count value for the current field with its corresponding adjacent field of opposite polarity for a plurality of fields of alternating polarity. An encoder, for example, encoder 180 may be adapted to encode the plurality of fields of alternating polarity at least in part based on a decision by the processor 172. Such a decision may be based at least in part on the calculated polarity change count value. At least one processor, for example, processor 172 may be adapted to decide whether to utilize a progressive scheme or an interlaced scheme to encode the plurality of fields of alternating polarity based at least in part on the calculated polarity change count value.

At least one processor, for example, processor 172 may be adapted to utilize at least one of: a top field first (TFF) scheme, a bottom field first (BFF) scheme, a top field first-repeat first field (TFF-RFF) scheme and a bottom field first-repeat first field (BFF-RFF) scheme to pair the plurality of fields of alternating polarity, and it may utilize a single-field scheme to avoid pairing some fields. At least one processor, for example, processor 172 may comprise suitable logic, circuitry and/or code that may be adapted to determine whether to utilize a progressive scheme or an interlaced scheme to encode the plurality of fields of alternating polarity at every field, or whether to encode single fields. At least one processor, for example, processor 172 may be adapted to calculate a value of at least one of: sum of cored absolute differences (SCAD), sum of quantized absolute differences (SQAD), sum of squares of absolute differences (SSAD) and sum of squares of quantized absolute differences (SSQAD) by comparing the current field with its alternate field of the same polarity. The SCAD calculation block 116 (FIG. 1) may be adapted to calculate the like-polarity field differences. The sum of cored absolute differences (SCAD) is the sum of the absolute values of differences over all pixels in a field. The current field may be compared, sample by sample, with the field that occurred two fields earlier, which is of the same polarity. The SCAD calculation block 116 may utilize a coring value that may eliminate the effect of small differences in the result. At least one processor, for example, processor 172 may be adapted to utilize at least in part the value of at least one of: the sum of cored absolute differences (SCAD), the sum of quantized absolute differences (SQAD), the sum of squares of absolute differences (SSAD) and the sum of squares of quantized absolute differences (SSQAD) to determine a format of the plurality of fields of alternating polarity.

At least one processor, for example, processor 172 may comprise suitable logic, circuitry and/or code that may be adapted to pipeline the plurality of fields of alternating polarity to improve coding efficiency and to minimize visible artifacts in determining whether to utilize a progressive scheme or an interlaced scheme to encode the plurality of fields of alternating polarity. At least one processor, for example, processor 172 may be adapted to utilize a progressive scheme for encoding the received plurality of fields of alternating polarity when there is substantially no inter-field motion. At least one processor, for example, processor 172 may be adapted to utilize an interlaced scheme for encoding the received plurality of fields of alternating polarity with significant inter-field motion. At least one processor, for example, processor 172 may comprise suitable logic, circuitry and/or code that may be adapted to determine whether to utilize a progressive scheme or an interlaced scheme to encode the received plurality of fields of alternating polarity by comparing loss of coding efficiency due to the utilization of progressive scheme and interlaced scheme. At least one processor, for example, processor 172 may be adapted to pipeline the plurality of fields of alternating polarity as part of determining whether to utilize a progressive scheme or an interlaced scheme to encode the plurality of fields of alternating polarity based at least in part on the calculated polarity change count value. The processor, for example, processor 172 may be adapted to update the pipelined plurality of fields of alternating polarity as part of determining whether to utilize a progressive scheme or an interlaced scheme to encode the plurality of fields of alternating polarity based on the calculated polarity change count value.

At least one processor, for example, processor 172 may be adapted to mark at least one of the plurality of fields of alternating polarity as a single field if a sum of cored absolute differences (SCAD) value of at least one of the plurality of fields of alternating polarity exceeds a first threshold value. The first threshold value may be SCAD_THD threshold value, which may be defined as the threshold of the sum of cored absolute differences (SCAD) value. At least one processor, for example, processor 172 may be adapted to mark at least one of the plurality of fields of alternating polarity as an element of at least one of: a first field of a top field first (TFF) frame and a first field of a bottom field first (BFF) frame, if the calculated polarity change count value of at least one of the plurality of fields of alternating polarity exceeds a second threshold value. The second threshold value may be PCC3_THD threshold value, which may be defined as the threshold of the incidence of polarity change count value=3, for example.

At least one processor, for example, processor 172 may be adapted to calculate the polarity change count value by counting a number of reversals of a difference polarity between a current field and an adjacent field within a column of samples. For example, for the sample numbering scheme [−2, 2] with location 0 being the location of the current sample, samples (−2, 0, 2) may be from the current field, for example, and samples (−1, 1) may be from the previous field. In such an embodiment, the PCC value for any given column of 5 samples may be one of 4 possible values: {0, 1, 2, 3}. When counting the number of polarity changes, only consecutive polarity changes may be counted.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   performing by one or more processors and/or circuits, functions comprising:
   calculating a polarity change count value for a current field and a corresponding adjacent field of opposite polarity over a plurality of fields of alternating polarity; and
   encoding said plurality of fields of alternating polarity based at least in part on said calculated polarity change count value.

2. The method according to claim 1, comprising weaving said current field with said corresponding adjacent field of opposite polarity in order to calculate said polarity change count value.

3. The method according to claim 1, comprising determining whether to utilize a progressive scheme or an interlaced scheme for said encoding of said plurality of fields of alternating polarity based on said calculated polarity change count value.

4. The method according to claim 3, wherein said determining is done for every field.

5. The method according to claim 3, comprising utilizing said progressive scheme for said encoding of said plurality of fields of alternating polarity with substantially no inter-field motion.

6. The method according to claim 3, comprising utilizing said interlaced scheme for said encoding of said plurality of fields of alternating polarity having inter-field motion.

7. The method according to claim 3, comprising pipelining said plurality of fields of alternating polarity.

8. The method according to claim 7, comprising updating said pipelined said plurality of fields of alternating polarity.

9. The method according to claim 1, comprising marking at least one of said plurality of fields of alternating polarity as a single field if one or more of: a sum of cored absolute differences (SCAD) value, a sum of quantized absolute differences (SQAD) value, a sum of squares of absolute differences (SSAD) value and/or a sum of squares of quantized absolute differences (SSQAD) value of said at least one of said plurality of fields of alternating polarity exceeds a first threshold value.

10. The method according to claim 1, comprising marking at least one of said plurality of fields of alternating polarity as one or both of: a first field of a top field first (TFF) frame and/or a first field of a bottom field first (BFF) frame, if said calculated polarity change count value of said at least one of said plurality of fields of alternating polarity exceeds a second threshold value.

11. The method according to claim 1, comprising utilizing one or more of: a top field first (TFF) scheme, a bottom field first (BFF) scheme, a top field first-repeat first field (TFF-RFF) scheme and/or a bottom field first-repeat first field (BFF-RFF) scheme to pair said plurality of fields of alternating polarity.

12. The method according to claim 1, comprising:
   calculating a value of one or more of: sum of cored absolute differences (SCAD), sum of quantized absolute differences (SQAD), sum of squares of absolute differences (SSAD) and/or sum of squares of quantized absolute differences (SSQAD) by comparing said current field with a neighboring field of same polarity; and
   utilizing said value of one or more of: said sum of cored absolute differences (SCAD), said sum of quantized absolute differences (SQAD), said sum of squares of absolute differences (SSAD) and/or said sum of squares of quantized absolute differences (SSQAD) to determine a format of said plurality of fields of alternating polarity.

13. The method according to claim 1, comprising calculating said polarity change count value by counting a number of reversals of a difference polarity between said current field and said corresponding adjacent field within a column of samples.

14. A system for processing video data, the system comprising:
   one or more processors that are operable to calculate a polarity change count value for a current field and a corresponding adjacent field of opposite polarity for a plurality of fields of alternating polarity; and
   said one or more processors are operable to encode based at least in part on said calculated polarity change count value.

15. The system according to claim 14, wherein said one or more processors are operable to weave said current field with said corresponding adjacent field of opposite polarity in order to calculate said polarity change count value.

16. The system according to claim 14, wherein said one or more processors are operable to determine whether to utilize a progressive scheme or an interlaced scheme for said encoding of said plurality of fields of alternating polarity based at least in part on said calculated polarity change count value.

17. The system according to claim 16, wherein said determining is done for every field.

18. The system according to claim 16, wherein said one or more processors are operable to utilize said progressive scheme for said encoding of said plurality of fields of alternating polarity with substantially no inter-field motion.

19. The system according to claim 16, wherein said one or more processors are operable to utilize said interlaced scheme for said encoding of said plurality of fields of alternating polarity having inter-field motion.

20. The system according to claim 16, wherein said one or more processors are operable to pipeline said plurality of fields of alternating polarity.

21. The system according to claim 20, wherein said one or more processors are operable to update said pipelined said plurality of fields of alternating polarity.

22. The system according to claim 14, wherein said one or more processors are operable to mark at least one of said plurality of fields of alternating polarity as a single field if one or more of: a sum of cored absolute differences (SCAD) value, a sum of quantized absolute differences (SQAD) value, a sum of squares of absolute differences (SSAD) value and/or a sum of squares of quantized absolute differences (SSQAD) value of said at least one of said plurality of fields of alternating polarity exceeds a first threshold value.

23. The system according to claim 14, wherein said one or more processors are operable to mark at least one of said plurality of fields of alternating polarity as one or both of: a first field of a top field first (TFF) frame and/or a first field of a bottom field first (BFF) frame, if said calculated polarity change count value of said at least one of said plurality of fields of alternating polarity exceeds a second threshold value.

24. The system according to claim 14, wherein said one or more processors are operable to utilize one or more of: a top field first (TFF) scheme, a bottom field first (BFF) scheme, a top field first-repeat first field (TFF-RFF) scheme and/or a bottom field first-repeat first field (BFF-RFF) scheme to pair said plurality of fields of alternating polarity.

25. The system according to claim 14, wherein said one or more processors are operable to:

calculate a value of one or more of: a sum of cored absolute differences (SCAD), a sum of quantized absolute differences (SQAD), a sum of squares of absolute differences (SSAD) and/or a sum of squares of quantized absolute differences (SSQAD) by comparing said current field with a neighboring field of same polarity; and utilize said value of one or more of: said sum of cored absolute differences (SCAD), said sum of quantized absolute differences (SQAD), said sum of squares of absolute differences (SSAD) and/or said sum of squares of quantized absolute differences (SSQAD) to determine a format of said plurality of fields of alternating polarity.

26. The system according to claim 14, wherein said one or more processors are operable to calculate said polarity change count value by counting a number of reversals of a difference polarity between said current field and said corresponding adjacent field within a column of samples.

* * * * *